(12) United States Patent
Lambert et al.

(10) Patent No.: US 11,340,991 B2
(45) Date of Patent: May 24, 2022

(54) TIME KEEPING SYSTEM AND METHOD THEREFOR

(71) Applicant: DELL PRODUCTS, LP, Round Rock, TX (US)

(72) Inventors: Timothy M. Lambert, Austin, TX (US); Elie Jreij, Pflugerville, TX (US); Jeffrey Kennedy, Austin, TX (US); Akkiah Choudary Maddukuri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 254 days.

(21) Appl. No.: 16/787,591

(22) Filed: Feb. 11, 2020

(65) Prior Publication Data

US 2021/0248038 A1 Aug. 12, 2021

(51) Int. Cl.
| | | |
|---|---|---|
| *G06F 11/14* | (2006.01) | |
| *G06F 11/34* | (2006.01) | |
| *G06F 13/42* | (2006.01) | |
| *G06F 1/14* | (2006.01) | |

(52) U.S. Cl.
CPC ............ *G06F 11/1417* (2013.01); *G06F 1/14* (2013.01); *G06F 11/3476* (2013.01); *G06F 13/4282* (2013.01)

(58) Field of Classification Search
CPC .... G06F 11/1417; G06F 11/3476; G06F 1/12; G06F 1/14; G06F 13/4282

USPC ......................................................... 713/500
See application file for complete search history.

(56) References Cited

U.S. PATENT DOCUMENTS

| | | | | |
|---|---|---|---|---|
| 7,716,515 | B2 * | 5/2010 | Shih .......................... | G06F 1/14 713/500 |
| 8,850,175 | B2 | 9/2014 | Cheng et al. | |
| 9,104,609 | B2 * | 8/2015 | Arai ..................... | G06F 11/1402 |
| 9,705,892 | B2 | 7/2017 | Lal et al. | |
| 10,175,717 | B2 * | 1/2019 | Lambert .................. | G06F 1/14 |
| 10,712,386 | B2 * | 7/2020 | Schamber .............. | G06Q 50/06 |
| 10,955,872 | B2 * | 3/2021 | Maddukuri ............... | G06F 1/14 |
| 2007/0266256 | A1 * | 11/2007 | Shah ....................... | H04L 63/12 713/178 |
| 2016/0103688 | A1 * | 4/2016 | Zhang ...................... | G06F 1/24 713/2 |
| 2016/0248852 | A1 * | 8/2016 | Lambert ................... | G06F 1/12 |
| 2018/0224884 | A1 * | 8/2018 | Oshima .............. | G06F 11/3058 |

* cited by examiner

*Primary Examiner* — Brian T Misiura
(74) *Attorney, Agent, or Firm* — Larson Newman, LLP

(57) ABSTRACT

A method may include initializing operation of a baseboard management controller at an information handling system. The baseboard management controller includes a real time clock. The method further includes receiving clock information from a real time clock circuit included at a field programmable gate array. The clock information at the real time clock at the baseboard management controller can be updated with the clock information received from the real time clock circuit included at the field programmable gate array.

19 Claims, 4 Drawing Sheets

TIME KEEPING SYSTEM AND METHOD THEREFOR

FIELD OF THE DISCLOSURE

This disclosure generally relates to information handling systems, and more particularly relates to keeping time in a baseboard management controller.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method may include initializing operation of a baseboard management controller at an information handling system. The baseboard management controller includes a real time clock. The method further includes receiving clock information from a real time clock circuit included at a field programmable gate array. The clock information at the real time clock at the baseboard management controller can be updated with the clock information received from the real time clock circuit included at the field programmable gate array.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
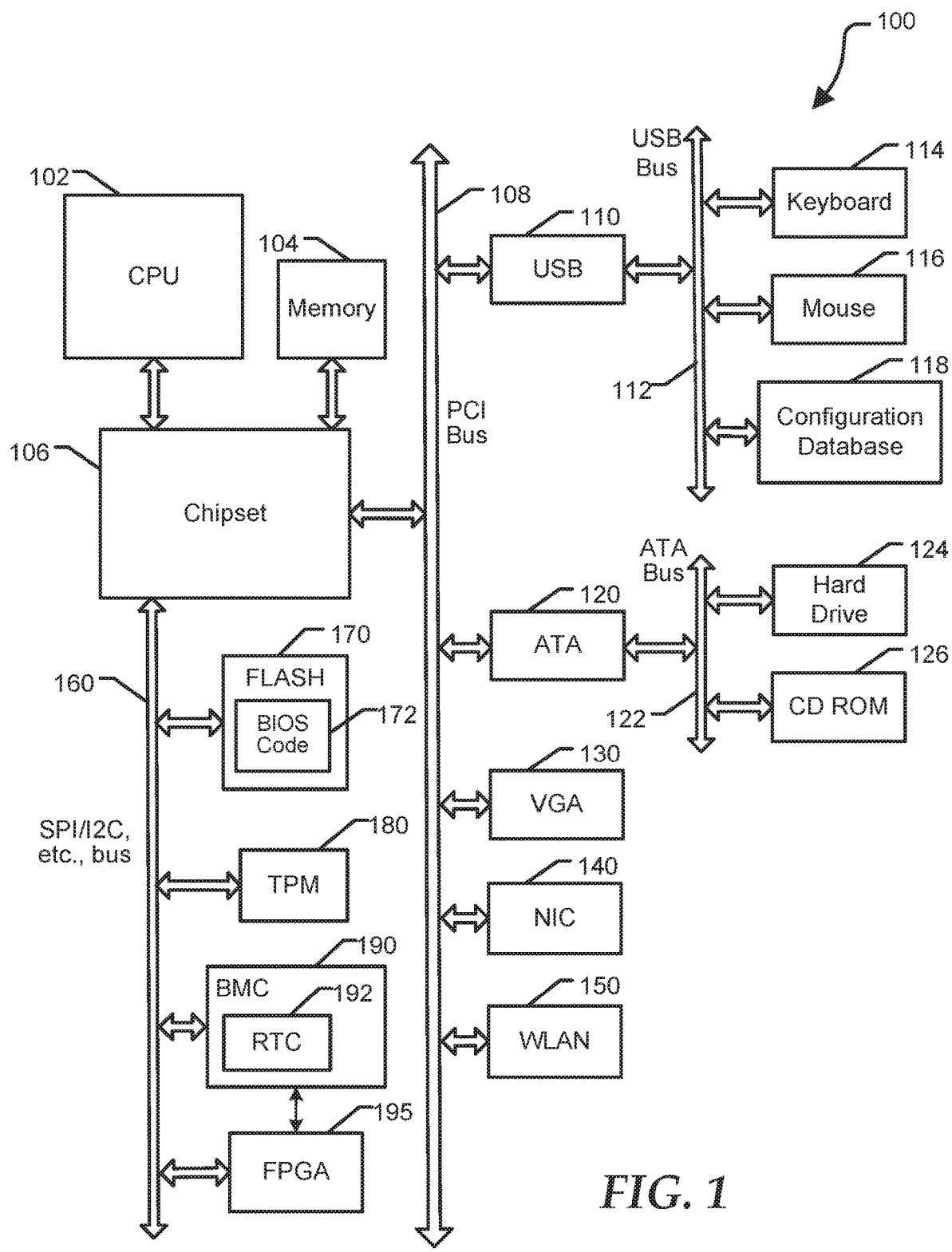
FIG. 1 is a block diagram of an information handling system according to a specific embodiment of the present disclosure.

FIG. 1 illustrates an information handling system 100 including a processor 102, a memory 104, a chipset 106, a PCI bus 108, a universal serial bus (USB) controller 110, a USB 112, a keyboard device 114, a mouse device controller 116, an eye-tracking device 118, an ATA bus controller 120, an ATA bus 122, a data storage device 124, a compact disk read only memory (CD ROM) device 126, a video graphics array (VGA) device 130, a display device 131, a network interface controller (NIC) 140, a wireless local area network (WLAN) controller 150, one or more serial busses 160, a non-volatile rand access memory (NVRAM) 170 for storing a basic input/output system (BIOS) 172, a trusted platform module (TPM) 180, a baseboard management controller (BMC) 190, and a field programmable gate array 195. BMC 190 includes a real time clock (RTC) 192.

NVRAM 170 can be referred to as a serial peripheral interface (SPI) flash storage device, BIOS SPI, and the like. TPM 180 is configured to ensure that the boot process starts from a trusted combination of hardware and software, and continues until the operating system has fully booted and applications are running. TPM 180 is compliant with an international standard for a secure cryptoprocessor, a dedicated microcontroller designed to secure hardware through integrated cryptographic keys. BMC 190 can be referred to as a service processor, an embedded controller (EC), and the like. BMC 190 includes a processor that can operate out-of-band with respect to CPU 102. For example, remote management systems can utilize BMC 190 to access components at information handling system independent of an operating state of CPU 102. BMC 190 may be responsible for performing low level hardware tasks including thermal management and power management operations. FPGA 195 can be referred to as a programmable logic device (PLD), a complex programmable logic device (CPLD), programmable array logic (PAL), and the like. FPGA 195 can be included at a primary circuit board used to implement information handling system 100, often referred to as a planar board or main board. The planar board can include an additional RTC circuit (not shown at FIG. 1), referred to herein as a host RTC.

Clock information maintained at RTC 192 can be used to timestamp entries at a system event log maintained at BMC 190. For example, BMC 190 may be responsible for managing out of band activities at system 100, and in response to determining that an error has occurred, generate an entry at the event log identifying the error. BMC 190 can associate the log entry with a timestamp generated based on the clock information maintained at the RTC 192. In an embodiment, clock information maintained at RTC 192 may not be correct. For example, clock information provided by the RTC 192 may be reset when BMC 190 is initialized, such as following a restoration of power at BMC 190. In an embodiment, clock information at the RTC 192 may be initialized to a build time of the firmware installed at BMC 190 following each reboot of BMC 190. Techniques disclosed herein provide means for updating the clock information at RTC 192 when BMC 190 is initialized. These techniques are described below with reference to FIGS. 2-4.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and one ore more components can be integrated together. For example, portions of chipset 106 can be integrated within CPU 102. In an embodiment, chipset 106 can include a platform controller hub (PCH). System 100 can include additional buses and bus protocols. Serial bus 160 is representative of one or more busses and/or bus protocols, such as a serial peripheral interface (SPI) bus, an inter-integrated circuit protocol (I2C) bus, a system management bus (SMB), a power management bus (PMBus), and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. In an embodiment, BIOS 172 can provide one or more runtime processes or device drivers that are configured to support functionality disclosed herein. After the initialization procedure is complete and an operating system, such as Windows, is loaded, computational operation of information handling system can begin.

In an embodiment, the BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

Figure 2:
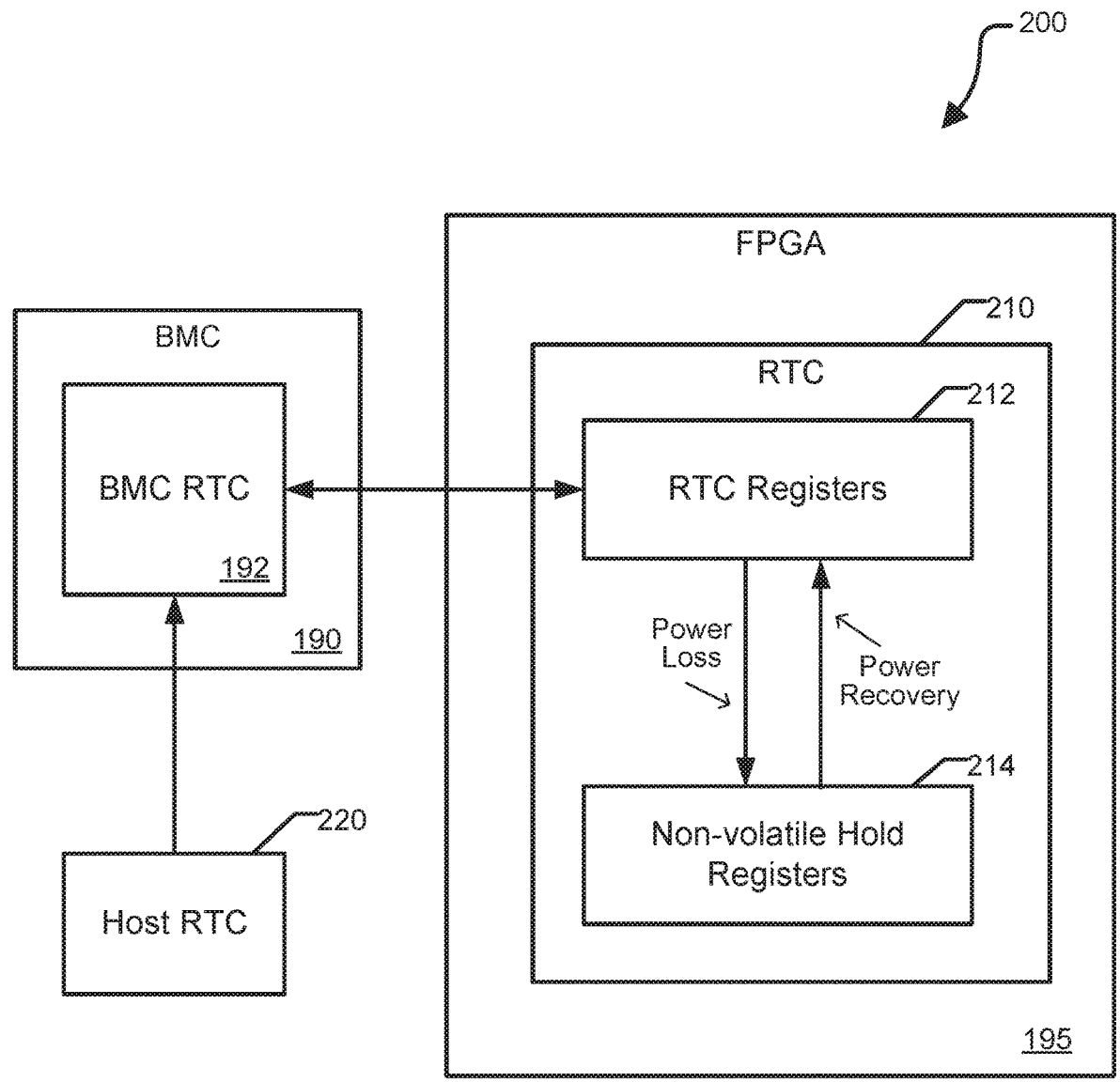
FIG. 2 is a block diagram illustrating a portion of the information handling system of FIG. 1 according to a specific embodiment of the present disclosure.

FIG. 2 shows a portion of information handling system 100 including BMC 190 and FPGA 195, according to a specific embodiment of the present disclosure. FPGA 190 includes an RTC 210, implemented by RTC registers 212 and non-volatile hold registers 214. Registers 212 and 214 may each include individual data registers corresponding to units of seconds, minutes, hours, days, months, years, and the like. FIG. 2 also shows a host RTC 220. The host RTC 220 can include a battery to maintain substantially accurate real time clock information at information handling system 100 when primary power is not provided to system 100. During initialization of information handling system, clock information maintained at host RTC 220 can be used to update the BMC RTC 192. However, during runtime of system 100, access to host RTC 220 may require a supervisor mode interrupt (SMI), which can significantly impact the computational efficiency of system 100.

During operation, the FPGA RTC 210 can be initialized and updated by BMC 190 based on clock information maintained at the BMC RTC 192. After initialization, RTC 210 is configured to periodically increment selected registers at registers 212 so that RTC 210 provides a representation of present time. In the event of a disruption of power at information handling system 100, an indicator identifying the disruption can be provided to FPGA 195. In response to receiving the indicator, FPGA 195 transfers current clock information maintained at RTC registers 212 to respective registers at non-volatile hold registers 214. A power supply at system 100 typically provides sufficient power to allow FPGA 195 to complete the transfer before power provided to FPGA 195 is lost. Upon restoration of power at system 100, the contents of hold registers 214 can be transferred back to RTC registers 212.

The FPGA RTC 210 can be referred to as a pseudo-real time clock due to the fact that clock information maintained at RTC 210 may not reflect time that has elapsed during the interruption of power to system 100. However, clock information maintained at RTC 210 can be assured to always be monotonic, for example the clock information will always progress in a forward direction. As described below, the clock information provided by the FPGA RTC 210 can be used by BMC 190 to timestamp event log entries when clock information at the BMC RTC 192 is not accurate, such as following initialization of BMC 190. Because the clock information maintained at the FPGA RTC 210 is monotonic, the timestamps generated by BMC 190 will accurately convey the logical order of individual event log entries, even if the clock information maintained at the FPGA RTC 210 falls behind an actual real time clock.

Figure 3:
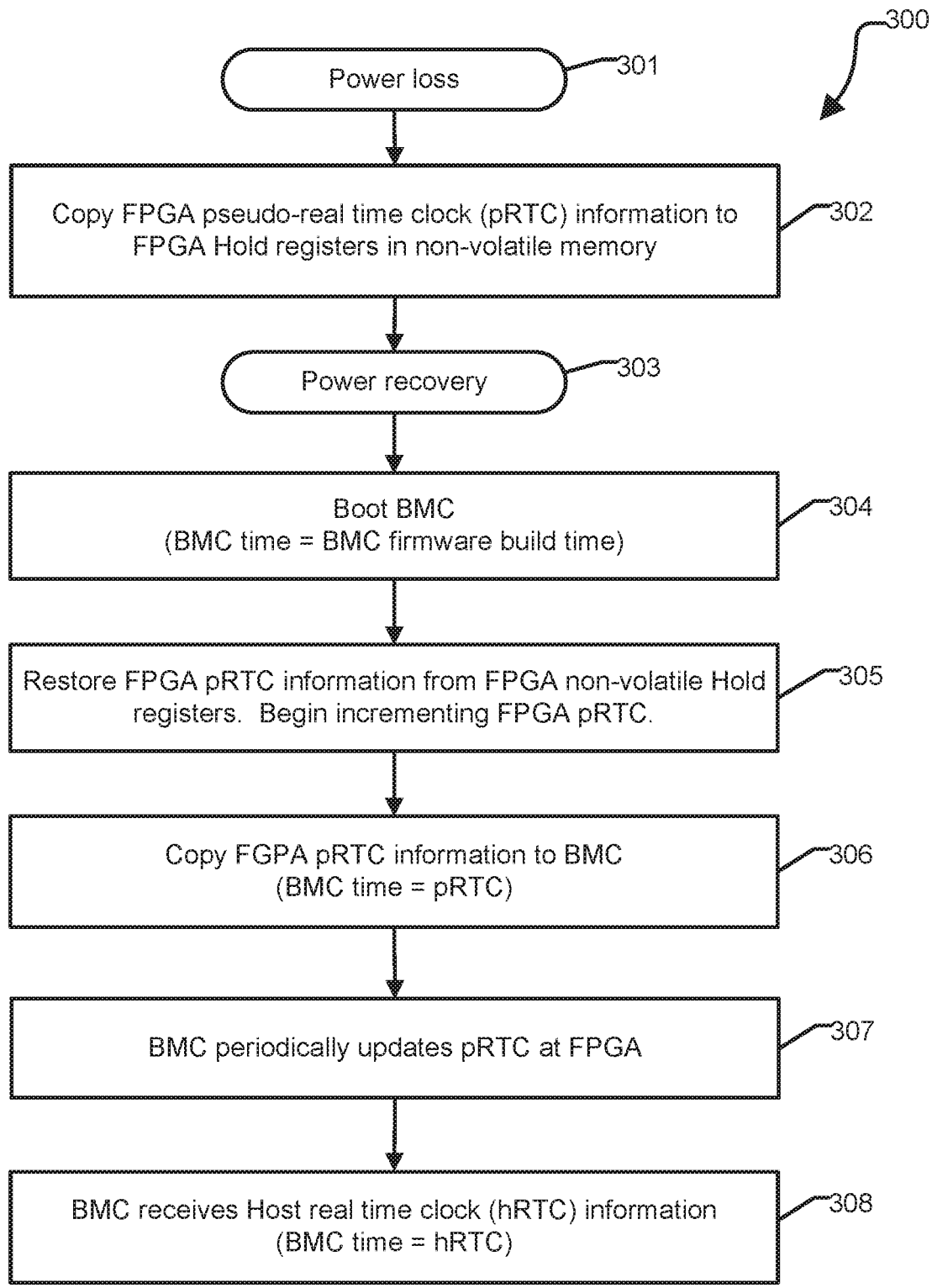
FIG. 3 is a flow diagram illustrating a method for maintaining a real time clock at a baseboard management controller according to a specific embodiment of the present disclosure.

FIG. 3 shows a method 300 for maintaining a real time clock at a baseboard management controller according to a specific embodiment of the present disclosure. In particular, method 300 illustrates updating an RTC at a BMC following an interruption of power at an information handling system. Method 300 begins at block 301 where a power loss occurs at an information handling system. For example, during a power failure or deactivation of a primary power switch at system 100, alternating current mains power provided to information handling system 100 may be interrupted. Information handling system 100 includes a power supply unit (PSU) to provide particular direct current voltage levels required by various components included at system 100. A PSU typically includes capacitors that can sustain voltage levels provided to system 100 for a short period of time following the loss of mains power, often referred to as a PSU hold time. At block 302, pseudo-real time clock (pRTC) information maintained at an FPGA RTC clock circuit is copied to non-volatile hold registers. For example, BMC 190, or another system management component can notify FPGA 195 that a power interruption has occurred; instructing FPGA to copy clock information maintained at the FPGA RTC registers 212 to non-volatile hold registers 214. The transferred clock information is maintained at hold registers 214 throughout the duration of the power interruption. The FPGA RTC 210 can be referred to as a pseudo-RTC because the clock information maintained therein may not be fully accurate, as described above.

Method 300 continues at block 303 where mains power provided to information handling system 100 is restored. At block 304, a baseboard management controller is initialized in response to the restoration of operating power. In the present embodiment, clock information at BMC RTC 192 is initialized to a value equal to the build time of firmware executing at BMC 190. Accordingly, the clock information at RTC 192 does not reflect actual present time. At block 305, clock information previously saved to the FGPA non-volatile hold registers is copied back to the FPGA RTC registers 212, and RTC 210 begins incrementing registers 212 to represent the passing of time. In an embodiment, the command to restore clock information at RTC registers 212 from hold registers 214 can be issued by BMC 190. At block 306, the pseudo-RTC clock information restored to RTC registers 212 is provided to the BMC RTC 192, replacing the default clock information loaded therein during initialization of BMC 190.

Method 300 proceeds to block 307 where BMC 190 can periodically update clock information maintained at the FPGA RTC 210 with the clock information being maintained at the BMC RTC 192, as the accuracy of clock information maintained at RTC 210 may diminish over time. Method 300 completes at block 308 where BMC 190 can receive clock information from a host RTC, and BMC 190 can replace the pseudo-real time clock information received from the FPGA RTC 210 with the clock information received from the host RTC. BMC 190 is configured to periodically update the FPGA RTC registers 212, both before and after receiving the host RTC time as information handling system 100 may be in a standby state for an extended period of time prior to host initialization following a reboot of BMC 190 or power interruption event. This avoids drift between the BMC RTC 192 and FPGA RTC 210 regardless of system state or time elapsed since the previous host initialization event. In an embodiment, BMC 190 may also receive real time clock information from a remote server according to a Network Time Protocol (NTP), if available.

Figure 4:
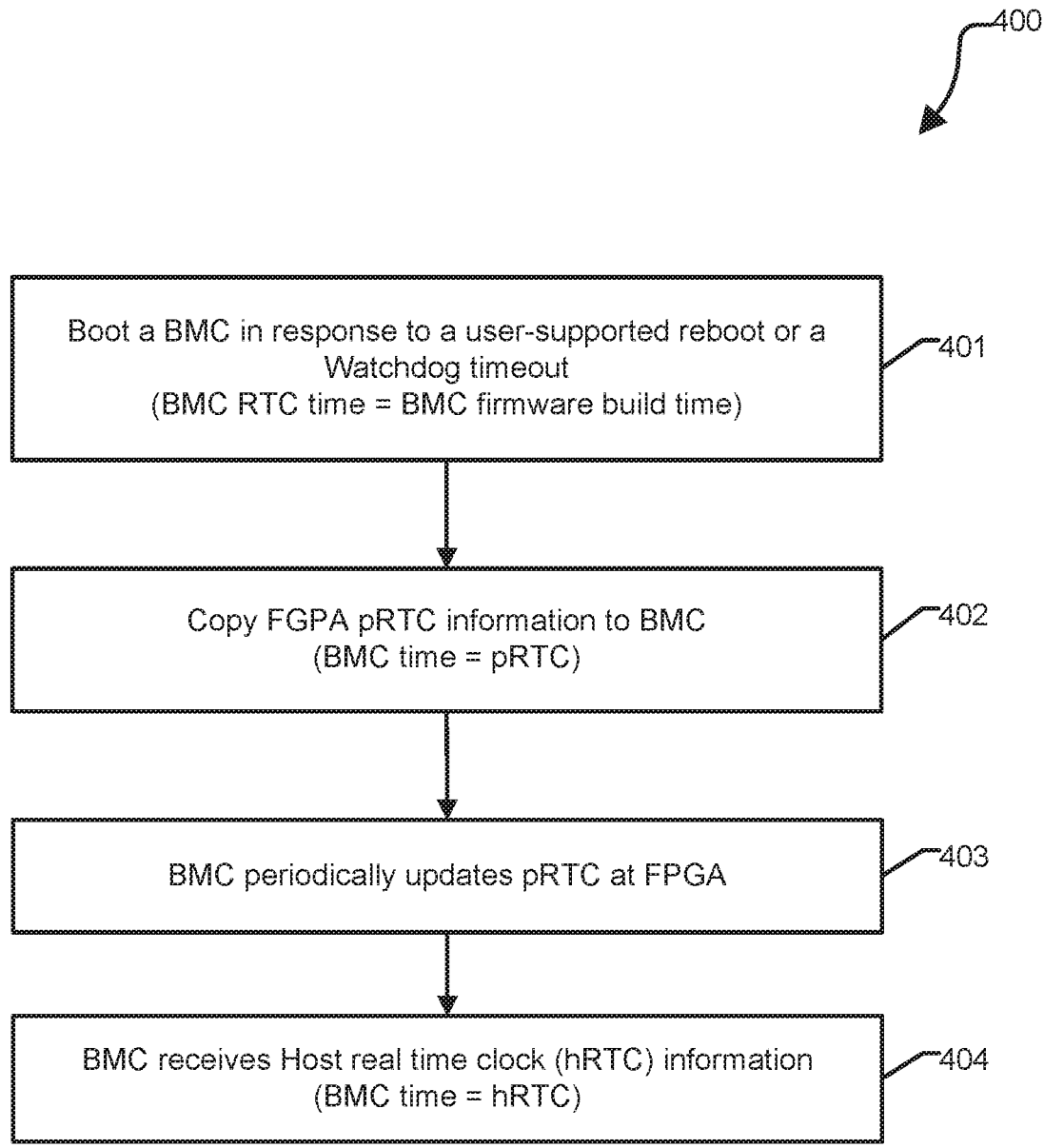
FIG. 4 is a flow diagram illustrating a method for maintaining a real time clock at baseboard management controller according to another embodiment of the present disclosure.

FIG. 4 shows a method 400 for maintaining a real time clock at a baseboard management controller according to another embodiment of the present disclosure. In particular, method 400 illustrates techniques for updating an RTC at a BMC following a reboot of the BMC. The method is applicable when the BMC does not maintain RTC clock information when deactivated and during initialization. Method 400 begins at block 401 where a BMC, such as BMC 190, is initialized following a user-supported reboot, in response to a watchdog timeout, and the like. The BMC may be initialized to an arbitrary default value, such as a build time of firmware at the BMC. A watchdog timer is an electronic timer that is used to detect and recover from malfunctions at an information handling system, for example BMC 190. During normal operation, the information handling system regularly resets the watchdog timer to prevent it from elapsing. If, due to a hardware fault or program error, the information handling system fails to reset the watchdog, the timer will elapse and generate a timeout signal. The timeout signal is used to initiate corrective action or actions, for example reinitializing the system.

Method 400 continues at block 402 where BMC RTC 192 is updated with clock information maintained at the FPGA RTC 210, for example clock information stored at RTC registers 212. Method 400 proceeds to block 403 where BMC 190 can periodically update clock information maintained at the FPGA RTC 210 with the clock information being maintained at the BMC RTC 192. Method 400 completes at block 404 where BMC 190 can receive clock information from a host RTC, and BMC 190 can replace the pseudo-real time clock information received from the FPGA RTC 210 with the clock information received from the host RTC. BMC 190 can continue to periodically update clock information maintained at the FPGA RTC 210 with the clock information being maintained at the BMC RTC 192.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   initializing operation of a baseboard management controller (BMC) at an information handling system, the BMC including a first real time clock (RTC);
   receiving clock information from a second RTC included at a field programmable gate array (FPGA);
   updating the first RTC with the clock information received from the second RTC;
   receive clock information from a host RTC during initialization of the information handling system; and
   periodically update the second RTC at the FPGA with the clock time information maintained at the first RTC.

2. The method of claim 1, further comprising:
   receiving a first indication at the FPGA that power at the information handling system is interrupted; and
   copying the clock information from the second RTC to a non-volatile memory device.

3. The method of claim 2, further comprising:
   receiving a second indication at the FPGA that power at the information handling system is restored following the interruption; and
   copying the clock information from the non-volatile memory device to the second RTC.

4. The method of claim 3, further comprising incrementing count registers at the second RTC periodically to update the clock information at the second RTC after the copying of the clock information from the non-volatile memory device.

5. The method of claim 1, further comprising:
   updating the first RTC with the clock information received from the host RTC.

6. The method of claim 5, further comprising incrementing the clock information at the first RTC periodically so that the first RTC maintains a representation of present time.

7. The method of claim 6, further comprising updating the second RTC at the FPGA periodically with present time information at the first RTC.

8. The method of claim 1, further comprising associating an event log entry generated by the BMC with the clock information maintained at the first RTC following the updating of the first RTC with the clock information received from the second RTC.

9. An information handling system comprising:
a host real time clock (RTC) to maintain an indication of present time;
a field programmable gate array (FPGA); and
a baseboard management controller (BMC) to maintain a first RTC, the BMC configured to:
initialize operation of the BMC;
receive clock information from a second RTC included at the FPGA;
update the first RTC with the clock information received from the second RTC;
receive clock information from the host RTC during initialization of the information handling system; and
periodically update the second RTC at the FPGA with the clock time information maintained at the first RTC.

10. The information handling system of claim 9, wherein the FPGA is configured to:
receive a first indication that power at the information handling system is interrupted; and
copy the clock information from the second RTC to a non-volatile memory device.

11. The information handling system of claim 10, wherein the FPGA is further configured to:
receive a second indication that power at the information handling system is restored following the interruption; and
copy the clock information from the non-volatile memory device to the second RTC.

12. The information handling system of claim 11, wherein the FPGA is further configured to periodically increment count registers at the second RTC after the copying of the clock information from the non-volatile memory device, the incrementing to update the clock information at the second RTC.

13. The information handling system of claim 9, wherein the BMC is further configured to:
updating the first RTC with the clock information received from the host RTC.

14. The information handling system of claim 13, wherein the BMC is further configured to increment the clock information at the first RTC periodically so that the first RTC maintains a representation of present time.

15. The information handling system of claim 14, wherein the BMC is further configured to periodically update the second RTC at the FPGA with the time information maintained at the first RTC.

16. The information handling system of claim 9, wherein the BMC is further configured to associate an event log entry generated by the BMC with the clock information maintained at the first RTC following the updating of the first RTC with the clock information received from the second RTC.

17. An information handling system comprising:
a host real time clock (RTC) to maintain an indication of present time;
a baseboard management controller (BMC) configured to maintain clock information at a first RTC; and
a field programmable gate array (FPGA) configured to:
maintain clock information at a second RTC implemented at the FPGA; and
provide the clock information maintained at the second RTC to the BMC to update the first RTC,
wherein the BMC further to:
receive clock information from the host RTC during initialization of the information handling system; and
periodically update the second RTC at the FPGA with the clock time information maintained at the first RTC.

18. The information handling system of claim 17, wherein the FPGA is further configured to:
receive a first indication that power at the information handling system is interrupted; and
copy the clock information from the second RTC to a non-volatile memory device.

19. The information handling system of claim 18, wherein the FPGA is further configured to:
receive a second indication that power at the information handling system is restored following the interruption; and
copy the clock information from the non-volatile memory device to the second RTC.

* * * * *